(12) United States Patent
Evans, II et al.

(10) Patent No.: US 12,501,399 B2
(45) Date of Patent: Dec. 16, 2025

(54) WORKSITE ALERT SYSTEM

(71) Applicants: Thomas James Evans, II, San Jon, NM (US); Baylee Marie Jones Salvador, Tucumcari, NM (US); Sariah Elizabeth Mardo, Tucumcari, NM (US); Rachel Eve Mardo, Tucumcari, NM (US); Nolan Alexander Ryen, Tucumcari, NM (US); Aaron Chand, Tucumcari, NM (US); Justin James Keith, Tucumcari, NM (US); Marcus Ray Lopez, Tucumcari, NM (US); Mikayla Lauren Klinger, Tucumcari, NM (US)

(72) Inventors: Thomas James Evans, II, San Jon, NM (US); Baylee Marie Jones Salvador, Tucumcari, NM (US); Sariah Elizabeth Mardo, Tucumcari, NM (US); Rachel Eve Mardo, Tucumcari, NM (US); Nolan Alexander Ryen, Tucumcari, NM (US); Aaron Chand, Tucumcari, NM (US); Justin James Keith, Tucumcari, NM (US); Marcus Ray Lopez, Tucumcari, NM (US); Mikayla Lauren Klinger, Tucumcari, NM (US)

( * ) Notice: Subject to any disclaimer, the term of this patent is extended or adjusted under 35 U.S.C. 154(b) by 323 days.

(21) Appl. No.: 18/215,982

(22) Filed: Jun. 29, 2023

(65) Prior Publication Data

US 2024/0406932 A1   Dec. 5, 2024

Related U.S. Application Data

(60) Provisional application No. 63/471,212, filed on Jun. 5, 2023.

(51) Int. Cl.
*H04W 68/00* (2009.01)
*H04W 76/14* (2018.01)
*H04W 84/18* (2009.01)

(52) U.S. Cl.
CPC ......... *H04W 68/005* (2013.01); *H04W 76/14* (2018.02); *H04W 84/18* (2013.01)

(58) Field of Classification Search
CPC .... H04W 68/005; H04W 76/14; H04W 84/18
(Continued)

(56) References Cited

U.S. PATENT DOCUMENTS

| | | | |
|---|---|---|---|
| 5,001,462 A | 3/1991 | Seemann et al. |
| 5,257,007 A | 10/1993 | Steil et al. |

(Continued)

*Primary Examiner* — Don N Vo

(57) ABSTRACT

This invention is directed to an ad-hoc peer-to-peer wireless worksite alert system with transceiver devices that communicate with each other using radio signals encoded with a unique identifier for each of the transceiver devices and provide light and audio alerts for worksite workers using the transceiver devices. Each transceiver device includes an alert indicator light, an audio speaker for emitting a siren, and a processor for scanning and transmitting status and alert radio signals. The ad-hoc peer-to-peer wireless worksite alert system does not require a centralized receiver unit and employs a mesh network for direct peer-to-peer communication. The simplicity of a peer-to-peer mesh network provides reliability and the ability to expand the mesh network as needed without additional and expensive equipment for centralized network control and relay.

14 Claims, 7 Drawing Sheets

(58) Field of Classification Search
USPC .......................................................... 455/458
See application file for complete search history.

(56) References Cited

U.S. PATENT DOCUMENTS

| | | | |
|---|---|---|---|
| 5,317,305 | A | 5/1994 | Campman |
| 5,578,992 | A | 11/1996 | Harding |
| 6,285,287 | B1 | 9/2001 | Jones et al. |
| 6,756,901 | B2 | 6/2004 | Campman |
| 6,946,959 | B2 | 9/2005 | Wang |
| 7,095,320 | B2 | 8/2006 | Wang |
| 8,710,979 | B2 | 4/2014 | Frederick |
| 10,520,282 | B2 | 12/2019 | Nangunoori |
| 10,909,831 | B1 * | 2/2021 | Altemose ............ G08B 21/0415 |
| 11,080,985 | B2 | 8/2021 | Palsson |
| 11,234,112 | B2 | 1/2022 | Baldree |
| 2004/0201474 | A1 | 10/2004 | Madovich |
| 2007/0075844 | A1 | 4/2007 | Taylor |
| 2009/0134982 | A1 * | 5/2009 | Robertson ............ G08B 27/005 |
| | | | 340/326 |
| 2009/0167536 | A1 | 7/2009 | Clark et al. |
| 2011/0012729 | A1 | 1/2011 | Hess |
| 2020/0076212 | A1 * | 3/2020 | Cervinka ............ G05B 23/0216 |
| 2020/0383172 | A1 * | 12/2020 | McCracken .......... H04W 88/06 |
| 2021/0176601 | A1 | 6/2021 | Alsahlawi et al. |
| 2023/0316888 | A1 * | 10/2023 | Thompson ............. A62B 9/006 |
| | | | 340/573.1 |

* cited by examiner

WORKSITE ALERT SYSTEM

CROSS-REFERENCE TO RELATED APPLICATIONS

This application is related to and claims priority to U.S. Provisional Patent Application No. 63/471,212, filed on Jun. 5, 2023, the entirety of which is hereby incorporated herein by references for all purposes.

BACKGROUND

A worksite can be a dangerous environment. For example, a worksite in the agriculture or construction industry includes many types of hazards that can potentially cause severe injuries and death to the workers at the worksite. Good communication among workers is very important in preventing these hazards from causing an accident. Unfortunately, worksites often operate at low visibility conditions and with noisy heavy machinery. These conditions hamper workers' ability to communicate with each other by visual signals and voice.

Existing solutions do not provide economical and user-friendly devices to enable workers to achieve good worksite communication. Cellphones can be used for worksite communication but are not optimized for that purpose. For example, cellphones are primarily for use with one-to-one communication, not for entire work crews on a worksite. Moreover, cell phones are multi-function devices that can cause worker distraction, too complicated to use in an emergency where time is of the essence, limited in operational time due to battery capacity, expensive to purchase, often unreliable due to signal interference, and not optimized in a noisy environment. A cellphone based alert system with centralized alert management is another option. However, such a system requires costly infrastructure and/or service subscription, and has similar limitations as those of cellphones, such as being expensive to purchase and often unreliable due to signal interference.

SUMMARY

This invention is directed to a peer-to-peer wireless worksite alert system with transceiver devices that communicate with each other using radio signals encoded with a unique identifier for each of the transceiver devices and provide visual and audible alerts for worksite workers using the transceiver devices. Each transceiver device includes an alert indicator light, an audio speaker for emitting a siren, and a processor for scanning and transmitting status and alert radio signals. The peer-to-peer wireless worksite alert system does not require a centralized receiver unit and employs an ad hoc mesh network for direct peer-to-peer communication. The simplicity of an ad hoc mesh network provides reliability and the ability to expand the mesh network as needed without additional and expensive equipment for centralized network control and relay.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, and/or components have been described at a relatively high-level, without detail, in order to avoid unnecessarily obscuring aspects of the present teachings.

This invention described herein is directed to a peer-to-peer wireless alert system with transceiver devices that communicate with each other using radio signals encoded with a unique identifier for each of the transceiver devices and provide light and audio alerts for worksite workers using the transceiver devices. The peer-to-peer wireless alert system is implemented as an ad hoc mesh network, as discussed in more below in more details. The inventors recognize that effective communication among workers at a worksite is essential to preventing accidents. While good communication among workers while dealing with dangerous machinery is essential in ensuring safety, miscommunication can lead to great consequences. Yet, none of the existing solutions provide a cost-effective and easy-to-use system that can be implemented. This invention is directed to an inexpensive siren and light-emitting alarm system that can both receive and transmit radio signals to warn workers in worksites, such as in construction zones using heavy equipment. Further, this invention is directed to utilizing peer-to-peer communication within an ad hoc mesh network that is built spontaneously to enable transceiver devices to be connected to each other without requiring typical network infrastructure equipment, such as a wireless router or access point. The peer-to-peer wireless alert system can be used in all kinds of heavy industries, such as construction, agriculture, oil fields, and other similar workplaces, to prevent accidents and injuries.

Figure 1:
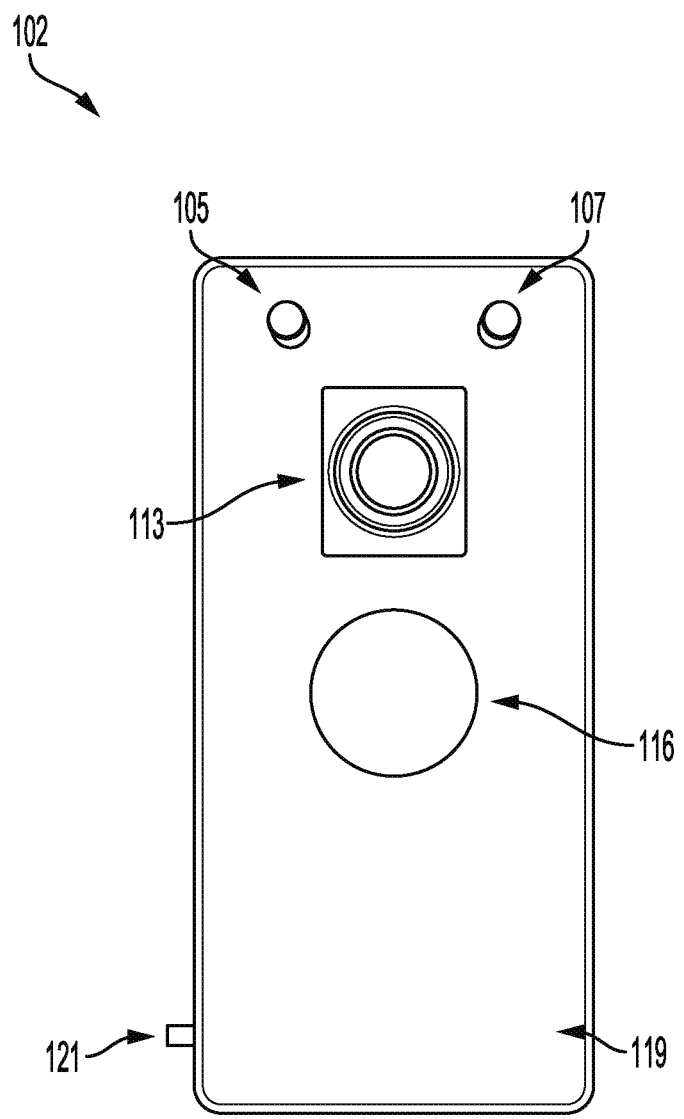
FIG. 1 is an example transceiver device of one embodiment of the peer-to-peer wireless worksite alert system.

FIG. 1 shows an example transceiver device 102 of the peer-to-peer wireless worksite alert system. Transceiver device 102 includes one or more visual indicator components such as status indicator light 105, alert indicator light 107, an audio indicator component such as audio speaker 113, trigger button 116, power switch 121, and case 119.

Audio speaker 113 can be powered by transceiver device 102 to emit a noise, such as a siren. In one embodiment, audio speaker 113 is implemented as a loud-speaker and transceiver device 102 causes audio speaker 113 to emit a noise, such as a siren. In other embodiments, audio speaker 113 may be implemented as other types of noise makers, such as an airhorn, a bell, or the like.

Status indicator light 105 and alert indicator light 107 can be powered on and off by transceiver device 102 and implemented with any light emitting device, such as incandescent bulbs, LED, halogen, laser, and the like. In one embodiment, each visual indicator component of transceiver device 102 can emit different colors of light and has flashing capability. In another embodiment, the visual indicator components of transceiver device 102 can comprise more than one alert indicator lights. The addition of indicator light increases the effectiveness of the peer-to-peer wireless worksite alert system because a siren may not be heard in extremely noisy environments found in many worksites. When powered on, status indicator light 105 and alert indicator light 107 may be configured and powered with enough intensity to provide an indicator to workers even in bright light conditions. In one embodiment, status indicator light 105 and alert indicator light 107 may each emit a single color of light in accordance with the intended indicator (e.g. green for status and red for alert). In other embodiments, status indicator light 105 and alert indicator light 107 may also be configured to emit different colors of light as controlled by transceiver device 102 for other types of indicators in addition to status and alert.

Trigger button 116 is an electrical switch that enables transceiver device 102 to receive a user's input to activate an alert, reset the device, or other inputs. Power switch 121 is an electrical switch for powering transceiver device 102 on or off. Case 119 is a structural enclosure for transceiver device 102. It can be made in a variety of ways and materials, such as 3D printing and injection molding with plastic, metal fabrication, and the like. Case 119 may include attaching mechanisms for fastening to machinery, such as magnets, straps, clips, screws, and the like.

Figure 2:
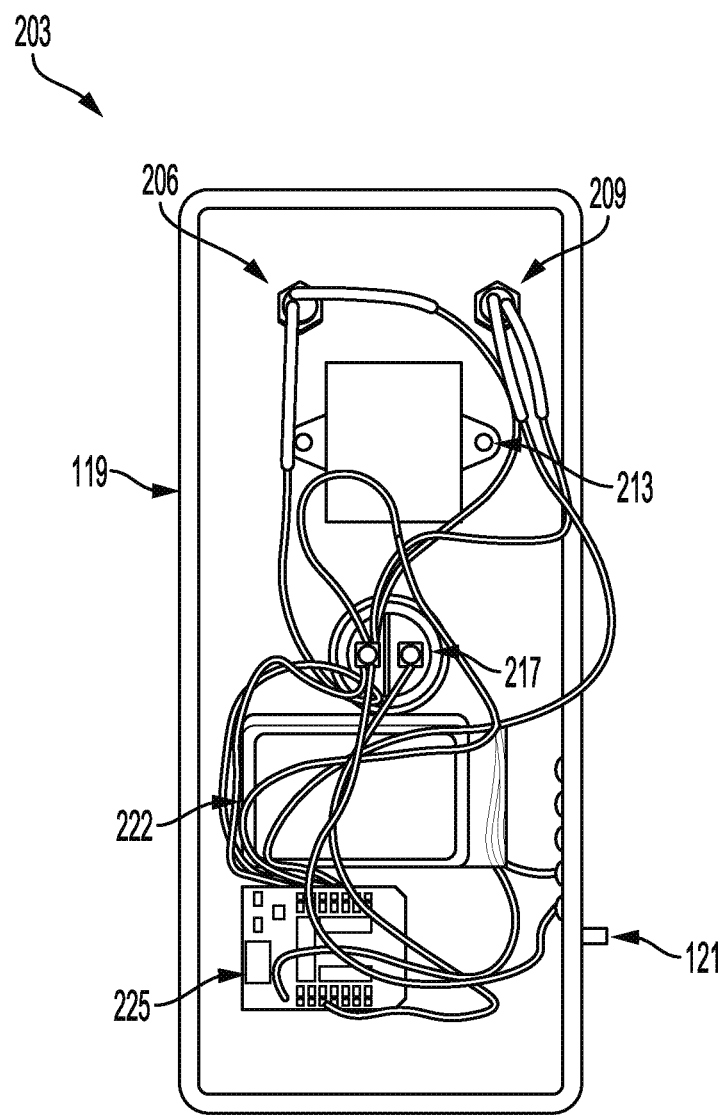
FIG. 2 is a diagram illustrating internal components of an example transceiver device.

FIG. 2 shows internal components of the example transceiver device 102 of the peer-to-peer wireless worksite alert system. The internal components include microprocessor 225, battery 222, trigger connection 217, audio speaker connection 213, light connection 206 and light connection 209. Microprocessor 225 controls transceiver device 102 to perform actions to implement the peer-to-peer wireless worksite alert system. Microprocessor 225 can be implemented as a programmable integrated circuit device. In one embodiment, the internal components of the transceiver device 102 include an antenna module that is configured to communicate radio signals with other transceiver devices in the ad hoc mesh network within a certain radius. The antenna module may be included in the microprocessor or may be a separate component. For example, microprocessor 225 is implemented as an IC board with a 433 LoRa radio wireless module, which includes an antenna module. In this configuration, the device is configured to provide a predetermined range, for example, a 5 km range, which can be made even greater when "piggybacking" the device off one another. In another embodiment, microprocessor 225 is implemented as an IC board with an ESP 8266, a Wi-Fi microchip with available networking software. Arduino software can be used to program some functions on microprocessor 225 with ESP 8266. In this configuration, the device is configured to provide stable communication within a predetermined radius, for example, up to 220 meters (approximately 722 feet), in an open field.

In an embodiment, microprocessor 225 comprising an ESP 8266 may be programmed with the example code below for controlling microprocessor 225 and connecting with other microprocessors:

```
//include libraries that contain functions for wifi and espnow
#include <ESP8266WiFi.h>
#include <espnow.h>
//convert microseconds to other measurements
#define SECONDS *1000000UL
#define MILLISECONDS *1000UL
uint8_t broadcastAddress[ ] = { 0xFF, 0xFF, 0xFF, 0xFF, 0xFF, 0xFF }; //set the
broadcast address of this unit
//create a structure that contains one variable
typedef struct struct_message {
    int a;
} struct_message;
struct_message data; //create a new variable of type "struct_message" that will store
the variable "a"'s value
//assign names to corresponding pin numbers
const unsigned int SPEAKER = 4;
const unsigned int BUTTON = 14;
const unsigned int redLED = 2;
const unsigned int greenLED = 0;
//create values
unsigned long rearmTimer;
unsigned long alertStartedTimer;
unsigned long buttonHeldDown;
//create true/false variables and functions
bool isExpired( );
bool button( );
bool armed;
bool triggered;
bool okayToSend;
//declare functions
void rearmUnit( );
void triggerUnit( );
void siren( );
void flashLED( );
void sendAlert( );
void disarmUnit( );
//when the unit is powered on, this program that will run once
void setup( ) {
```

```
//assign input and output pins
pinMode(BUTTON, INPUT_PULLUP);
pinMode(SPEAKER, OUTPUT);
pinMode(redLED, OUTPUT);
pinMode(greenLED, OUTPUT);
//set LEDs to off
digitalWrite(redLED, 0);
digitalWrite(greenLED, 0);
//set wifi to station mode for espnow
WiFi.mode(WIFI_STA);
WiFi.disconnect( );
//initialize espnow and set unit role to be both controller & follower
esp_now_init( );
esp_now_set_self_role(ESP_NOW_ROLE_COMBO);
esp_now_register_recv_cb(onDataRecv);   //register callback funtion that will be
called when the data is received
esp_now_add_peer(broadcastAddress, ESP_NOW_ROLE_COMBO, 1, NULL,
0); //pair with other units
   rearmTimer = micros( ); //begin timer to arm the unit
}
//set the following programs to run in a continous loop
void loop( ) {
  rearmUnit( );
  triggerUnit( );
  siren( );
  flashLED( );
  sendAlert( );
  disarmUnit( );
}
//program that checks if timers are over a certain length of time
bool isExpired(unsigned long timer, unsigned long delay) {
   //if the timer is over a set length of time, outut true; if not, output false
   if (micros( ) - timer > delay) return true;
   else return false;
}
//program that checks for button presses
bool button( ) {
   static unsigned long timer; //create a local variable called "timer"
   //if the button is pressed start the timer, "timer"
   if (digitalRead(BUTTON)) {
      timer = micros( );
   }
   //if the button has been held down for more that 100 milliseconds, output true; if
not, output false
   if (isExpired(timer, 100 MILLISECONDS)) return true;
   else return false;
}
//program that will arm the unit and turn on the green LED 3 seconds after start up
or 3 seconds after being reset
void rearmUnit( ) {
   if (isExpired(rearmTimer, 3 SECONDS)) {
      armed = true;
      digitalWrite(greenLED, 1);
   }
}
//program that triggers the unit and sets armed to false if the button has been pressed,
the unit is armed, and not already triggered
void triggerUnit( ) {
   if (button( ) && armed && !triggered) {
      triggered = true;
      armed = false;
      alertStartedTimer = micros( ); //start a timer called "alertStartedTimer"
   }
}
//program that sounds the aubile siren when the unit is triggered
void siren( ) {
   //create static local variables
   static unsigned long timer = 0;
   static unsigned int sound = 3000;
   static int step = 10;
   //the speaker will soud the siren starting at a frequency of 3000Hz and increase by
steps of 10Hz every millisecond
   if (triggered == false) noTone(SPEAKER);
   else {
      if (isExpired(timer, 1 MILLISECONDS)) {
         timer = micros( );
         sound = sound + step;
         if (sound > 4000 || sound < 2000) step = -step; //if the frequency reaches over
4000Hz or below 2000Hz, the steps will become inversed
```

```
            tone(SPEAKER, sound);
         }
      }
}
//program that flashes the red LED when the unit is triggered
void flashLED( ) {
   if (triggered) {
      //create static local variables
      static unsigned long timer;
      static bool LEDState = false;
      //every .25 seconds alternate switching the red LED on and off
      if (isExpired(timer, .25 SECONDS)) {
         if (LEDState) {
            digitalWrite(redLED, 0);
            LEDState = false;
         } else {
            digitalWrite(redLED, 1);
            LEDState = true;
         }
         timer = micros( );
      }
   }
}
//send alert message to other units
void sendAlert( ) {
   //create static local variable
   static unsigned long timer = 0;
   //if trigered, transmit alert message to other units every second for 3 seconds
   if (triggered && isExpired(timer, 1 SECONDS)) {
      timer = micros( );
      if (!isExpired(alertStartedTimer, 3 SECONDS)) {
         esp_now_send(0, (uint8_t *)&data, sizeof(data));
      }
   }
}
//if the unit is armed and it recieves an alert message, trigger the unit
void onDataRecv(uint8_t *mac, uint8_t *incomingData, uint8_t len) {
   if (armed) {
      triggered = true;
   }
}
//program that sets triggered to false if the button has been held for 3 seconds
void disarmUnit( ) {
   if (!button( )) buttonHeldDown = micros( );
   if (button( ) && isExpired(buttonHeldDown, 3 SECONDS)) {
      triggered = false;
      digitalWrite(redLED, 0);        //red LED off
      digitalWrite(greenLED, 0);      //green led off
      rearmTimer = micros( );         //begin timer to rearm the unit
```

Microprocessor 225 may be powered by a variety of power sources. In one embodiment, microprocessor 225 is powered by battery 222, which may be any types of suitable battery, such as rechargeable Lithium-Ion battery, standard alkaline battery, and the like. In one embodiment, a rechargeable battery including but not limited to, EEMB LP402730 rechargeable battery with 3.7V and 150 mAh can be used for powering transceiver device 102. In another embodiment, microprocessor 225 may be powered by connection to an external power source, such as power output of the machinery to which transceiver device 102 is fastened. Microprocessor 225 is connected to trigger button 116 through trigger connection 217 and can receive a user's input, such as activating an alert, resetting the device, or other inputs. Microprocessor 225 is connected to indicator lights such as status indicator light 105 and alert indicator light 107 through light connection 209 and light connection 206, and can control the lights to provide indicators, such as a status indicator, an alert indicator and the like. Microprocessor 225 is connected to audio speaker 113 through audio speaker connection 213, and can control the speaker to produce audible alerts such as a siren.

Figure 3:
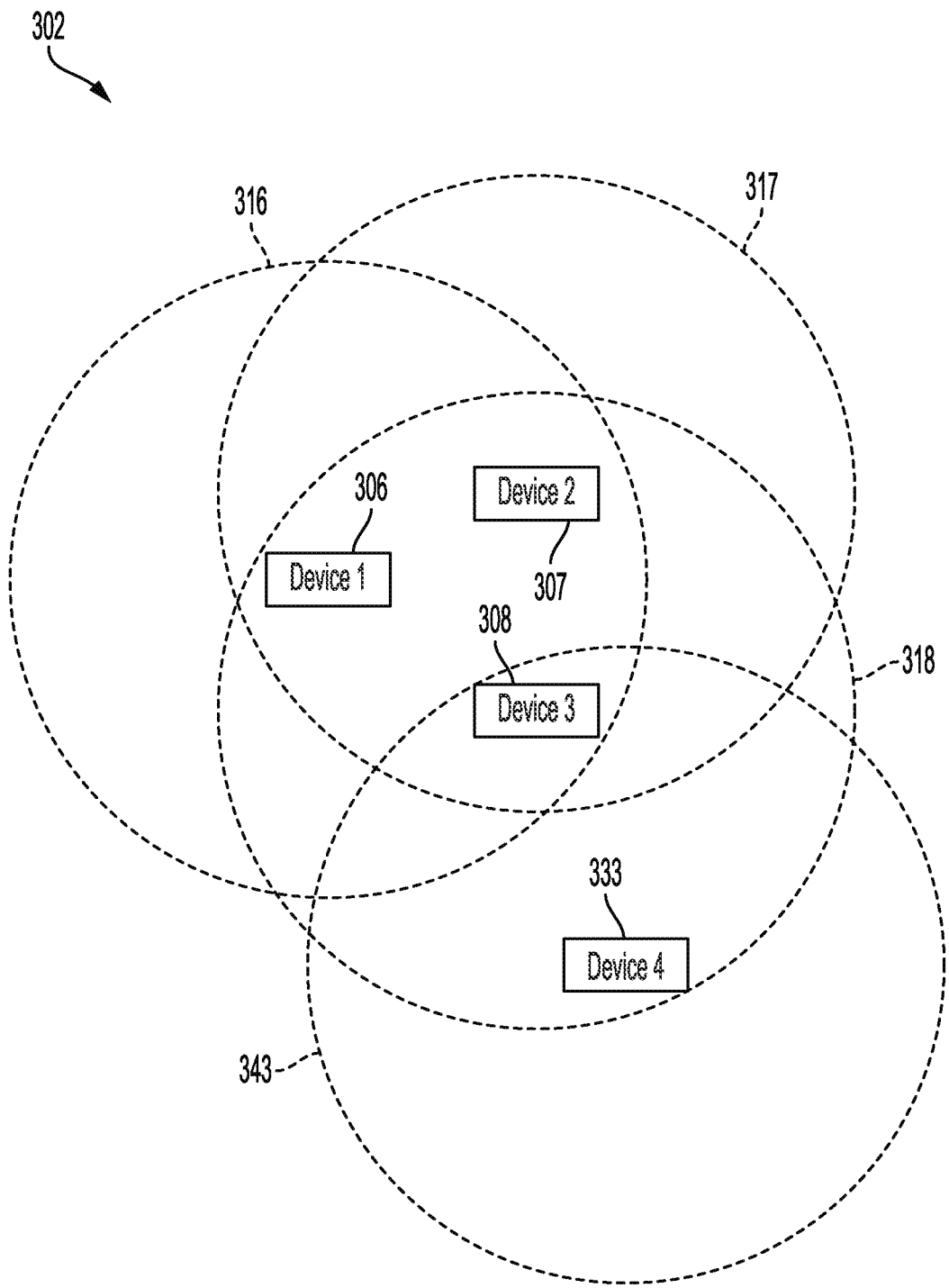
FIG. 3 is a diagram illustrating an example ad hoc mesh network of the peer-to-peer wireless worksite alert system.

FIG. 3 is a diagram that shows an example ad hoc mesh network of the peer-to-peer wireless worksite alert system. In this example, the ad hoc mesh network of the peer-to-peer wireless worksite alert system includes transceiver devices 306-308 having corresponding signal ranges 316-318. As shown in FIG. 3, transceiver devices 306-309 in the peer-to-peer wireless worksite alert system can have overlapping ranges and can directly communicate with each other. One major advantage of the peer-to-peer wireless worksite alert system is the ability to extend the range of the ad hoc mesh network as needed. For example, when transceiver device 333 enters the ad hoc mesh network, its signal range 343 can only reach transceiver device 308 but not transceivers 306-307. However, the peer-to-peer wireless worksite alert system is configured such that transceiver 308 relays signals (such as alert signals and status signals) from transceiver device 333 to transceiver devices 306-307, thus extending the ad hoc mesh network.

Figure 4:
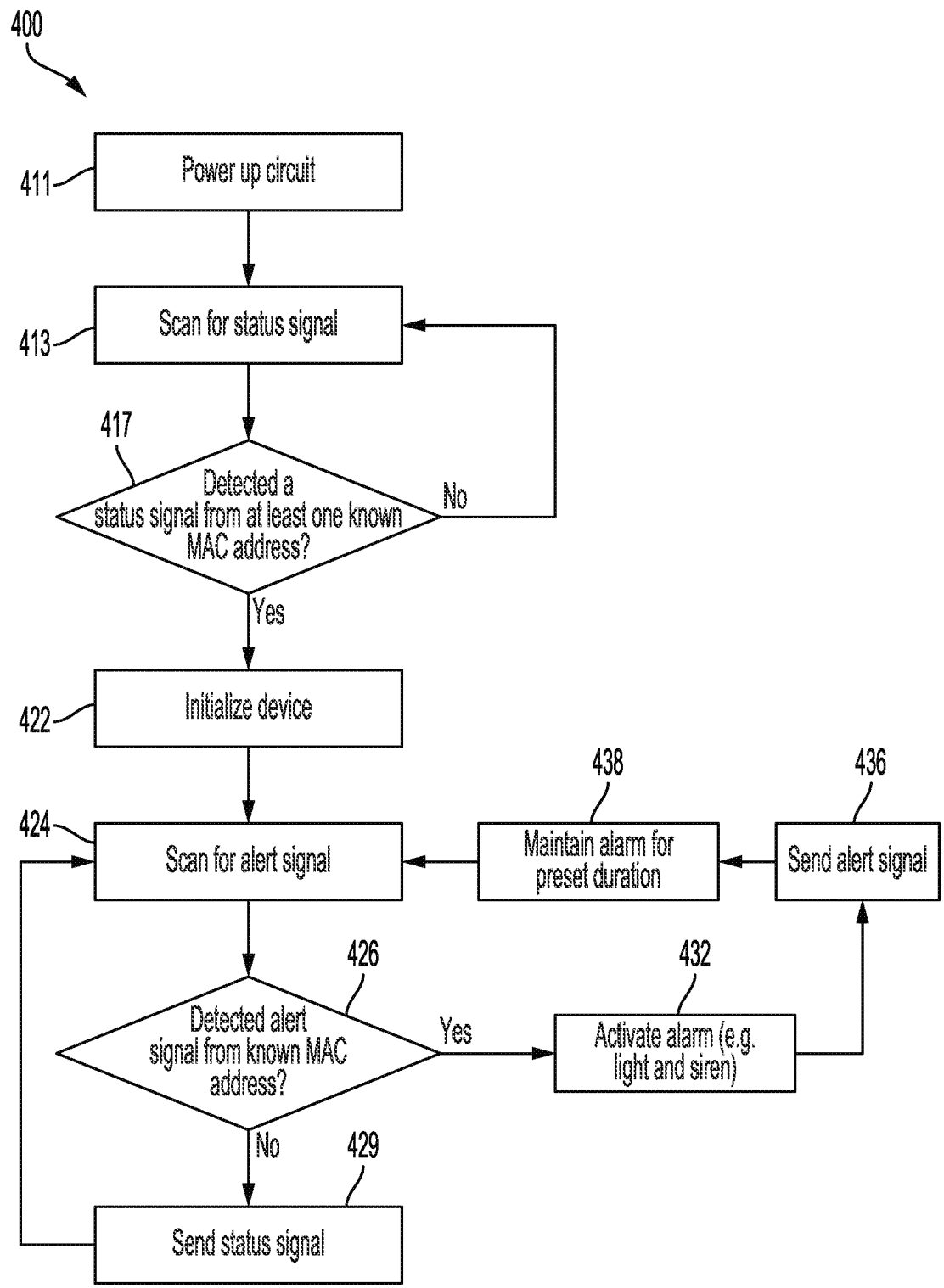
FIG. 4 is flow chart illustrating an example logic of a transceiver device of the peer-to-peer wireless worksite alert system.

FIG. 4 is flow chart that shows an example logic 400 of a transceiver device of the peer-to-peer wireless worksite alert system. The example logic 400 can be programmed into microprocessor 225 to control the transceiver device. At block 411, the transceiver device is turned on, such as by a user activating power switch 121. At block 413, the transceiver device scans for a status signal from other transceiver devices in the peer-to-peer wireless worksite alert system. At decision block 417, a determination is made whether a status signal from at least one known MAC address of a transceiver device has been detected. This decision is implemented so that a new transceiver device to an ad hoc mesh network will initialize only when there is at least another transceiver device in the ad hoc mesh network. In another embodiment, this decision is made when the transceiver device is initialized to form an ad hoc mesh network by connecting to another transceiver device. After communicatively connected to the ad hoc mesh network, this decision making will not be performed again. MAC addresses associated with a particular peer-to-peer wireless worksite alert system are programmed into the transceiver device associated with that system so that only transceiver devices assigned to that particular system are in the ad hoc mesh network. This would avoid interference by other devices and enable multiple different peer-to-peer wireless worksite alert systems to operate concurrently in proximity.

Returning to decision block 417, if no status signal is detected, the logic returns to block 413 to continue scanning. The logic may further include a timeout period such that when no status signal is detected after a period, the transceiver device may power down. At decision block 417, if a status signal from at least one known MAC address has been detected, then the logic moves to 422 where the transceiver device initializes for normal operation. In one embodiment, during the initialization process as indicated in the flow chart, if a first device (or device that starts the initialization process) did not find any neighboring device to add to the network then it will indicate with an error code or through a visual representation that there are no other devices added to the ad hoc mesh network. At block 424, the transceiver device scans for an alert signal. At decision block 426, a determination is made whether an alert signal is detected from a known MAC address. If an alert signal is detected from a known MAC address, the logic moves to block 432 where an alarm is activated. This can include activating alert indicator light 107 and emitting a siren through audio speaker 113.

At block 436, an alert signal is sent. This alert signal includes the MAC address of the transceiver device implementing this logic. The alert signal is received by other transceiver devices in the range of the ad hoc mesh network and causes those transceiver devices to activate the alarm as well, resulting in workers of the worksite being informed of a hazard. This alert signal can also serve as a relay signal from a transceiver device that sent the initial alert signal detected in block 424 but is out of the signal range of other transceiver devices in the ad hoc mesh network. At block 438, the alarm is maintained for a preset duration. The logic may also include a reset process where a user can deactivate the alarm, such as by pressing and holding the trigger button 116 for a duration. Then, the logic is returned to block 424 where the transceiver device scans for another alert signal.

Returning to decision block 426, if no alert signal is detected, the logic moves to block 429 where a status signal is sent and returns to block 424 to scan for alert signal. The logic may include a preset time interval for scanning and sending the status signal to occur. The logic would also move to block 432 if an alarm is activated on the transceiver device by a user, such as by pressing trigger button 116.

Figure 5:
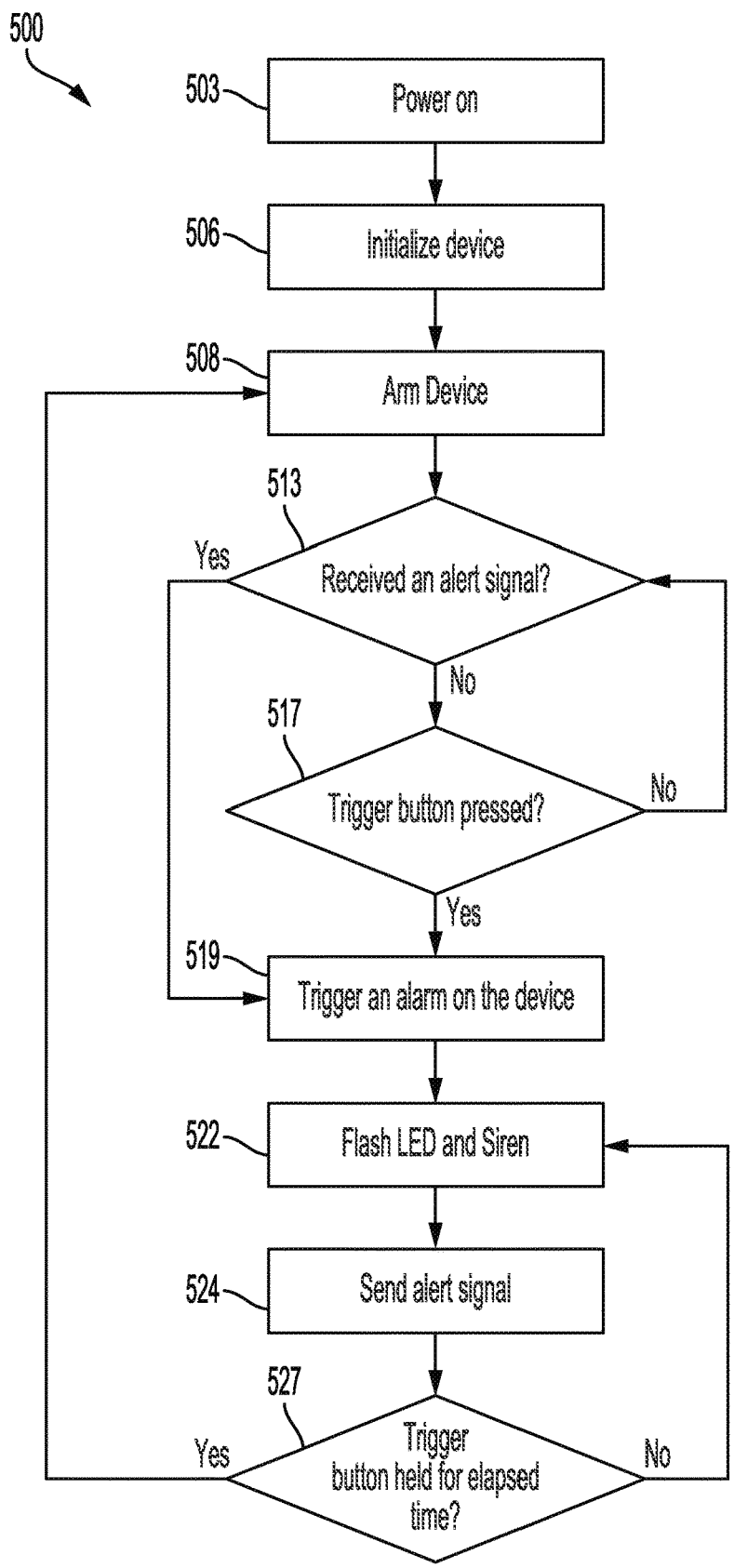
FIG. 5 is flow chart illustrating another example logic of a transceiver device of the peer-to-peer wireless worksite alert system.

FIG. 5 is flow chart that shows another example logic 500 of a transceiver device of the peer-to-peer wireless worksite alert system. At block 503, the transceiver device is powered on. At block 506, the transceiver device is initialized. At block 508, the transceiver device is armed so that it is ready to scan and receive signals from other transceiver devices of the peer-to-peer wireless worksite alert system. At decision block 513, a determination is made whether an alert signal has been received. If a signal has been received, the logic moves to block 519. If a signal has not been received, the logic moves to decision block 517 where a determination is made whether the trigger button on the transceiver device has been pressed. If no, then the logic moves back to decision block 513. If the trigger button has been pressed, the logic moves to block 519.

At block 519, an alarm is triggered on the transceiver device. At block 522, the alert indicator light is made to flash and the audio speaker is made to emit a siren. At block 524, an alert signal is sent by the transceiver device. At decision block 527, a determination is made whether the trigger button has been held for a predetermined elapsed time. In one embodiment, the elapsed time is 3 seconds. If no, then the logic flow moves back to block 522. If the trigger button has been held for the predetermined elapsed time, then the transceiver device has been reset and the logic moves back to block 508.

Figure 6:
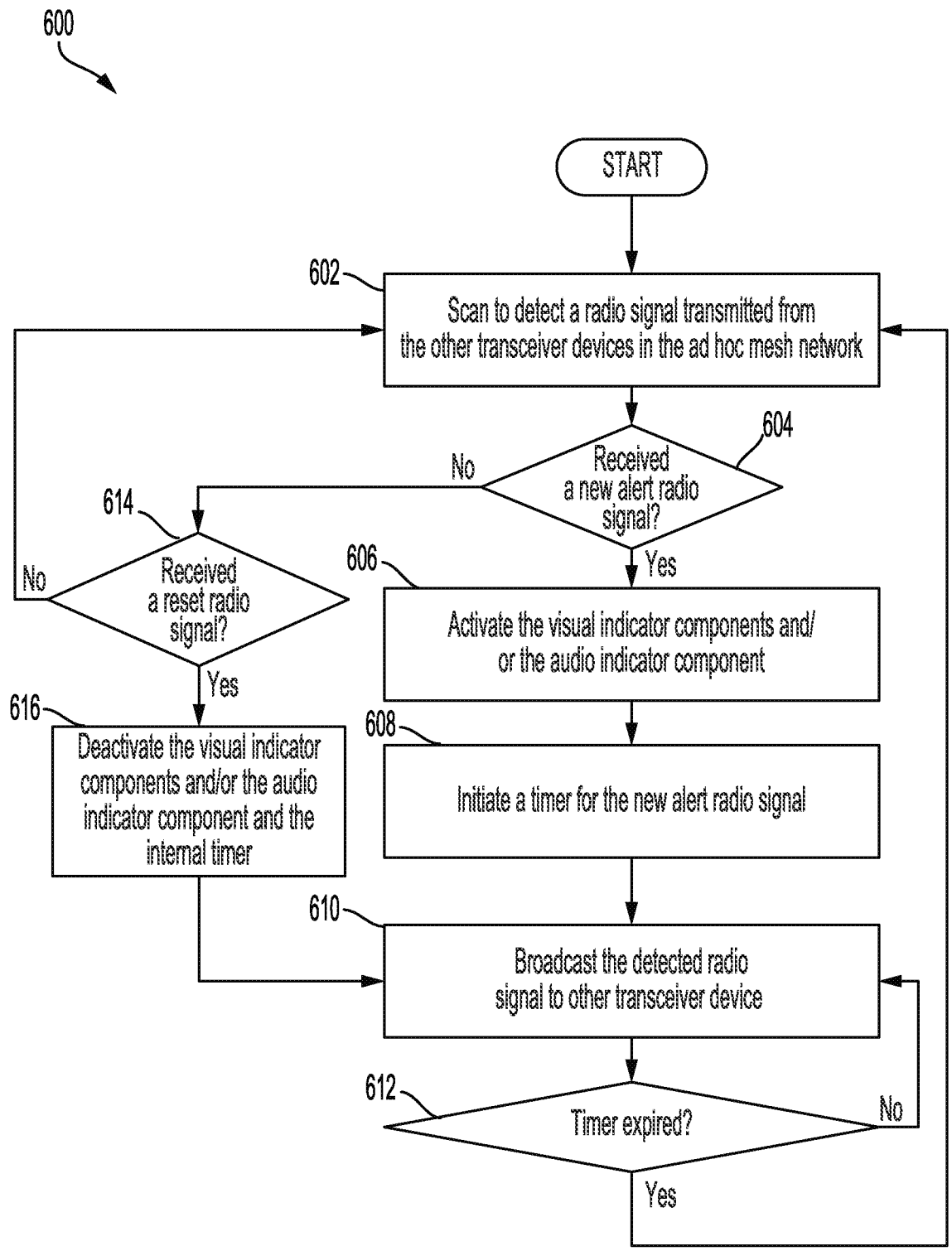
FIG. 6 is flow chart illustrating another example logic of a transceiver device of the peer-to-peer wireless worksite alert system.

FIG. 6 is flow chart that shows yet another example logic 600 of a transceiver device of the peer-to-peer wireless worksite alert system after the transceiver device has been initiated and communicatively connected to at least one of the other transceiver devices in an ad hoc mesh network. In this embodiment, each transceiver device in the ad hoc mesh network can directly communicate with each other over a peer-to-peer connection as long as they are within a certain distance. At block 602, the transceiver device scans to detect radio signals transmitted from other transceiver devices in the ad hoc mesh network. At decision block 604, a determination is made whether the received radios signal is a new alert signal. There are many ways to determine whether the received radio signal is a new alert radio signal. In one example, if the transceiver device has been triggered to inform a user an alert by a new alert radio signal or activation of a trigger button, any subsequently received alert radio signal will be considered as an old or previously known alert radio signal until the transceiver device is reset. In another example, an internal timer is used to determine whether the received radio signal is a new alert signal. In this example, an internal timer is activated when the transceiver device activates visual and audio indicator components in response to receipt of a new alert radio signal or detecting an activation of the button to generate an alarm signal. The internal timer will expire when it is assumed that the alert has been taken care of because a predetermined time has passed since the alert has been issued. As such, if the internal timer does not expire, any subsequent alert radio signal may be considered as old or previously known alert signal. If the received radio signal is a new alert signal, the logic moves to block 606. At block 606, the transceiver device activates visual and/or audio indicator components based on information along with the alert radio signal. One or more visual indicator components are made to emit a different color of light and/or have flashing capability. The audio indicator component such as a speaker is made to emit a siren. In one embodiment, an audio indicator component can emit a siren in a different level of decibel that is suitable for a particular work environment. At block 608, the internal timer is activated for the new alert radio signal. As discussed above, using the internal timer is one of many ways of determining if the received radio signal is a new alert radio signal. At block 610, the transceiver device broadcasts the received radio signal to the other transceiver devices in the ad hoc mesh network using peer-to-peer communication. In one embodiment, the received radio signal is periodically broadcasted based on a determination interval. At a decision block 612, a determination is made whether the timer associated with the alert signal expired. If no, then the logic flow moves back to block 610. If the internal timer associated with the alert signal has expired, then the logic moves back to block 602 where the transceiver device is reset and ready to scan to detect a new alert radio signal. In another embodiment, the internal timer is used to cause one of visual indicator component or audio component to emit a reminder sign so that the user checks to see whether the situation that caused the alert has been taken care of and thus the reset signal should have been received. If the situation that caused the alert has been taken care of, the user will manually reset the transceiver device by pressing the trigger button for the predetermined elapsed time as discussed above.

At decision block 604, if the radio signal received is not a new alert radio signal, the logic moves to decision block 614 where determination is made whether the received radio signal is a reset signal. If no, then the logic moves back to block 602. If the received radio signal is a reset signal, the logic moves to block 616. At block 616, the transceiver device is reset by deactivating the visual/audio indicator components and the internal timer. The logic moves back to block 602 where the transceiver device scans to detect a radio signal transmitted from other devices in the ad hoc mesh network.

Figure 7:
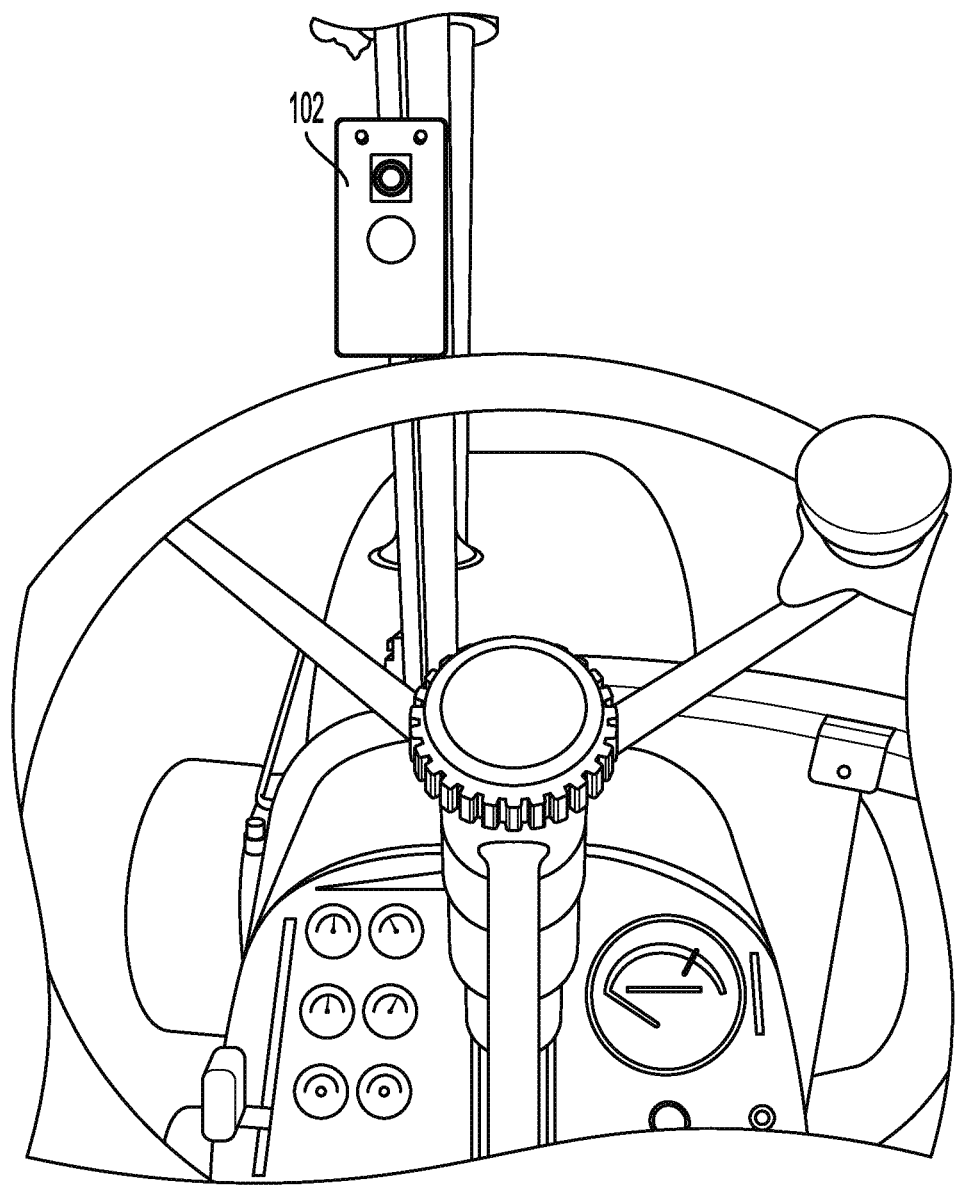
FIG. 7 is an example transceiver device mounted on a vehicle in an example worksite environment.

FIG. 7 shows transceiver device 102 of the peer-to-peer wireless worksite alert system in an example worksite environment. In this example, transceiver device 102 comprises a housing with a mounting component such as Velcro, magnet, etc., and is mounted on a tractor in a direct line of sight of the operator. This example transceiver device 102 is mounted with a magnet mounting mechanism. Transceiver device 102 shows an illuminated status indicator light. In an emergency, the operator can easily press trigger button 116 to initiate an alarm. If an alarm is triggered by other transceiver devices in a ad hoc mesh network of the peer-to-peer wireless worksite alert system in an example worksite environment, the operator can readily see an illuminated alert signal indicator on transceiver device 102 and may hear the siren.

It is to be appreciated that the peer-to-peer wireless worksite alert system does not include a centralized receiver unit as shown in ad hoc mesh network 302 in FIG. 3. The simplicity of a peer-to-peer network provides reliability and the ability to expand the ad hoc mesh network as needed without additional and expensive equipment for centralized network control and relay.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A transceiver device communicatively connected to at least one of other transceiver devices in an ad-hoc mesh network, the transceiver device comprising:
   visual indicator components, each visual indicator component having a different color light and flashing capability;
   an audio indicator component configured to generate a sound with several levels of decibels and or frequency;
   an antenna module configured to communicate radio signals with the other transceiver devices in the ad hoc mesh network within a certain radius;
   a microprocessor configured to:
      scan to detect a radio signal transmitted from the other transceiver devices in the ad hoc mesh network, wherein the radio signal includes information about a unique identifier associated with the transceiver device, the unique identifier being used to form the ad hoc mesh network with the other transceiver devices;

in response to detecting the radio signal that is a new alert radio signal, activate the visual indicator components and/or the audio indicator component based on information included in the radio signal; and cause the antenna module to broadcast the detected radio signal to any transceiver device in the ad hoc mesh network within the certain radius based on a predetermined interval; and an internal timer that is activated and associated with the new alert radio signal, wherein the microprocessor is further configured to cause the antenna module to broadcast the alert radio signal based on the predetermined interval until the internal timer expires.

2. The transceiver device of claim 1, further comprising a housing with a mounting component that is used to attach the transceiver device to a designated surface.

3. The transceiver device of claim 1, wherein the new alert radio signal is ignored if the transceiver device has been triggered previously by another alert radio signal.

4. The transceiver device of claim 1, further comprising a button, wherein in response to detecting an activation of the button to generate an alarm signal, the microprocessor is further configured to:

activate the visual indicator components and the audio indicator component;

generate a radio signal that comprise an alert radio signal; and cause the antenna module to broadcast the radio signal to any transceiver device in the ad hoc mesh network within the certain radius based on the predetermined interval.

5. The transceiver device of claim 1, wherein in response to detecting that the internal timer has expired, the microprocessor is further configured to deactivate the visual indicator components and/or the audio indicator component.

6. The transceiver device of claim 1, wherein in response to detecting an activation of the button to reset the alarm signal, the microprocessor is further configured to:

deactivate the visual indicator components and the audio indicator component;

generate a radio signal which is a reset radio signal; and cause the antenna module to broadcast the reset radio signal to any transceiver device in the ad hoc mesh network within the certain radius.

7. The transceiver device of claim 1, wherein in response to detecting the radio signal that is a reset radio signal, the microprocessor is further configured to deactivate the visual indicator components and/or the audio indicator component based on information included in the radio signal;

cause the antenna module to broadcast the detected radio signal to any transceiver device in the ad hoc mesh network within the certain radius; and if the internal timer has been activated, deactivate the internal timer by marking the internal timer as being expired.

8. The transceiver device of claim 1, wherein the radio signal is determined to be a new alert radio signal if the transceiver device has not been triggered to activate the visual indicator components and/or the audio indicator component or the internal timer has been activated and is not expired.

9. A method for providing worksite alerts by a transceiver device communicatively connected to at least one of other transceiver devices in an ad-hoc mesh network, each transceiver device having a microprocessor, visual indicator components, an audio indicator component, and an antenna module, the method comprising:

scanning to detect a radio signal transmitted from the other transceiver devices in the ad hoc mesh network, wherein the radio signal includes information about a unique identifier associated with the transceiver device, the unique identifier being used to form the ad hoc mesh network with the other transceiver devices;

in response to detecting the radio signal that is a new alert radio signal, activating the visual indicator components and/or the audio indicator component based on information included in the radio signal;

causing the antenna module to broadcast the detected radio signal to any transceiver device in the ad hoc mesh network within the certain radius based on a predetermined interval;

activating an internal timer that is associated with the new alert radio signal; and causing the antenna module to broadcast the alert radio signal based on the predetermined interval until the internal timer expires.

10. The method of claim 9, further comprising ignoring the new alert radio signal if the transceiver device has been triggered by another alert radio signal.

11. The method of claim 9, further comprising, in response to detecting an activation of a button to generate an alarm signal:

activating the visual indicator components and the audio indicator component;

generating a radio signal that comprise an alert radio signal; and causing the antenna module to broadcast the radio signal to any transceiver device in the ad hoc mesh network within the certain radius based on the predetermined interval.

12. The method of claim 9, further comprising:

detecting that the internal timer has expired; and deactivating the visual indicator components and/or the audio indicator component.

13. The method of claim 9, further comprising:

detecting an activation of the button to reset the alarm signal;

deactivating the visual indicator components and the audio indicator component;

generating a radio signal which is a reset radio signal; and causing the antenna module to broadcast the reset radio signal to any transceiver device in the ad hoc mesh network within a certain radius.

14. The method of claim 9, further comprising:

detecting the radio signal that is a reset radio signal;

deactivating the visual indicator components and/or the audio indicator component based on information included in the reset radio signal;

causing the antenna module to broadcast the detected radio signal to any transceiver device in the ad hoc mesh network within the certain radius; and if the internal timer has been activated, deactivating the internal timer by marking the internal timer as being expired.

\* \* \* \* \*